United States Patent Office 3,046,269
Patented July 24, 1962

3,046,269
CATALYTIC PROCESS FOR POLYMERIZING ETHYLENICALLY UNSATURATED HYDROCARBONS
Howard J. Cohen and John M. Hoyt, Cincinnati, Ohio, assignors to National Distillers and Chemical Corporation, New York, N.Y., a corporation of Virginia
No Drawing. Filed Sept. 22, 1959, Ser. No. 841,449
9 Claims. (Cl. 260—94.9)

The present invention relates to an improved polymerization process and, particularly, to such a process utilizing a catalyst system that is novel for polymerizing olefins to high molecular weight polymers. Still more particularly, the invention relates to such a process utilizing a catalyst system that exhibits a synergistic degree of activity, is advantageously soluble in conventional reaction media employed for polymerizing olefins, and is stable against objectionable hydrolysis and thermal decomposition.

In the process embodied herein, the catalyst system comprises (1) a suitable reducing agent and (2) a mixture of the following compounds in proportional amounts to provide a synergistic effect in polymerization of olefins:

(A) A compound of the formula $M^nO(OSiR_3)_y$ wherein M is the metal $Ti^{+3}$ to $^{+4}$, $Zr^{+3}$ to $^{+4}$, $Hf^{+3}$ to $^{+4}$, $V^{+3}$ to $^{+5}$, $Nb^{+3}$ to $^{+5}$ and $Ta^{+3}$ to $^{+5}$, $n$ is the valence of the metal M, $y=n-2$, and R is a hydrocarbon radical, e.g., alkyl, aralkyl, alkenyl, aryl, cycloalkyl, etc., and preferably an alkyl radical such as one containing from one to 8 carbon atoms and, specifically, methyl, ethyl, n-propyl, isopropyl, n-butyl, sec-butyl, isobutyl, t-butyl, n-amyl, isoamyl, n-hexyl, n-octyl, 2-ethylhexyl, etc., as well as other radicals, such as phenyl. Compounds fully within the scope of the foregoing formula may be prepared by the process described in copending application, S.N. 832,497, filed August 10, 1959, entitled "Triorganosiloxymetal Oxides."

(B) A compound of the formula $M^n(OSiR_3)_y$ where M is $Ti^{+2}$ to $^{+4}$, $Zr^{+2}$ to $^{+4}$, $Hf^{+2}$ to $^{+4}$, $V^{+2}$ to $^{+5}$, $Nb^{+2}$ to $^{+5}$, and $Ta^{+2}$ to $^{+5}$, $n$ is the valence of the metal M, $y=n$, and R has the aforesaid significance. Specific compounds falling within the scope of Formula A include tris(trimethylsiloxy)vandadium monoxide, bis(trimethylsiloxy)-titanium monoxide, and bis(trimethylsiloxy)zirconium monoxide, etc. and, in Formula B, tetrakis(trimethylsiloxy)titanium $Ti[OSi(CH_3)_3]_4$, tetrakis(trimethylsiloxy)-zirconium, and pentakis(trimethylsiloxy)tantalum, etc. Such compounds may, for example, be prepared by the method of English and Sommer disclosed in J.A.C.S., vol. 77, 170 (1955), and specifically by reacting the appropriate triorganosilanol (e.g., trimethylsilanol) with titanium tetrachloride to produce tetrakis (trimethylsiloxy)-titane; and by the method of Zeitler and Brown in J.A.C.S. 79, 4616 (1957), by reacting an appropriate triorganosilanol (e.g., triphenylsilanol) with a tetraalkoxytitanium (e.g., tetrabutoxytitanium) to prepare tetrakis-triphenyl siloxy titanium.

In reference to the reducing agent that is one component of the catalyst system embodied herein, particularly suitable and preferred are the alkylaluminum halides, such as dialkylaluminum halides, alkylaluminum dihalides, and mixtures thereof generally called "alkylaluminum sesquihalides." Thus, embodied for use herein are ethylaluminum sesquibromide, ethylaluminum sesquichloride, methylaluminum dibromide, dimethylaluminum bromide, methylaluminum dichloride, dimethylaluminum chloride, butylaluminum dibromide, dibutylaluminum chloride, hexylaluminum dibromide, dihexylaluminum bromide, and similar alkylaluminum halides and mixtures thereof. Still other reducing agents embodied for use herein are strong reducing agents such as alkali metals (e.g., sodium), alkaline earth metals (e.g., magnesium, calcium), organoalkali compounds (e.g., alkylsodium), organometallic compounds (e.g., trialkylaluminum), and the like, with further specific examples including tripropylaluminum, triisobutylaluminum, tri-n-decylaluminum, butylmagnesium chloride, dibutylmagnesium, metal hydrides such as lithium hydride, magnesium hydride, etc.

Reaction conditions at which the polymerization may be carried out with the novel catalyst system include the following:

Temperature _____ From $-120°$ C. to $300°$ C. preferably 50 to $250°$ C.
Pressure _____ Subatmospheric to 3000 atmospheres, preferably atmospheric pressure to 200 atmospheres.
Ratio of catalyst components (mole ratio of reducing agents : silicon-containing compounds) __ 0.1 to 50 : 1 preferably 1 to 20 : 1.
Total catalyst concentration (based on weight of monomer to be polymerized) _____ 0.005 to 10%.

The compounds which may be polymerized according to the present invention consist generally of hydrocarbons, such as the olefins containing from 2 to 16 carbon atoms that are polymerizable when contacted with the aforedefined combination catalyst under polymerizing conditions of temperature and pressure. Specific examples of such polymerizable hydrocarbons include ethylene, propylene, butene-1, pentene-1, hexene-1, 4-methyl-pentene-1, butadiene, isoprene, styrene and methyl styrene, and the like. Mixtures of ethylene and butene-1 may also be used for copolymerization with the catalyst system embodied herein.

The polymerization reaction is carried out either in batch, semi-continuous, or continuous operations. Most conveniently, and in preferred embodiments, the process at lower pressure operations is carried out in a diluent or liquid reaction medium, the amount not being unduly critical, but it should be at least sufficient to permit effective agitation and preferably to hold the major portion of the polymer in solution.

Suitable organic media include aliphatic alkanes or cycloalkanes such as pentane, hexane, heptane, cyclohexane; hydrogenated aromatics such as tetrahydronaphthalene, high molecular weight liquid paraffins which are liquid at the reaction temperature; aromatics such as benzene, toluene, xylene; halogenated aromatics such as chlorobenzene, chloronaphthalene, etc. Other reaction media include ethylbenzene, isopropyl benzene, ethyl toluene, n-propyl benzene, diethyl benzenes, mono- and dialkyl naphthalenes, n-pentane, n-octane, isooctane, methyl cyclohexane, tetralin, decalin and other inert liquid hydrocarbons. In carrying out the polymerization reaction at relatively high pressures, such as at one thousand atmospheres and above, it may be carried out in the absence or substantial absence of such reaction media and, in such instances, the need for solvent recovery systems, etc. may be obviated. It is preferred that the reaction medium that is used be essentially free of impurities which may react to destroy catalyst activity or which copolymerize with the olefinic hydrocarbon; that is, appreciable quantities of materials such as carbon dioxide, oxygen, and acetylenic compounds should preferably be absent.

For this process the polymerizable hydrocarbons may be used in substantially pure form or there may be used a mixture containing major quantities thereof, provided no impurities are present in substantial amounts to destroy the catalyst and/or contaminate the polymer products. For instance, ethylene obtained by the cracking of hydrocarbon streams is satisfactory if acetylenic and oxygenated materials are not present in more than trace amounts.

In carrying out the herein described polymerization process, it is preferable and highly desirable to maintain the polymerization zone free of extraneous gases. This can be done by keeping the reactor blanketed at all times with an inert gas, for example, operating with an inert gas such as nitrogen, argon, or helium. Preferably, the reactor and its contents are blanketed with the polymerizable substance, e.g., ethylene gas, to avoid unnecessary dilution of the reactor contents with inert gases.

In reference to the other component (of the total catalyst) comprising the mixture of compounds of the aforesaid Formulas A and B, highly suitable is the use of substantially a mole to mole ratio of such compounds. Such a ratio provides, in the combination catalyst with the reducing agent, a synergistic effect in catalytic activity in polymerizing olefins as compared to use of the same reducing agent under comparable conditions, but in which the other component consists of either the compound of Formula A or the compound of Formula B. However, and although mole to mole ratios of the compounds of Formulas A and B are particularly preferred, it is to be understood that the ratios can be altered, as for example, within the range of one mole of the compound of Formula A to from 0.1 to 10 moles of Compound B to provide synergistic activity in catalyzing polymerization of olefins. In a particularly preferred embodiment, the process embodied herein is carried out with use, as the catalyst, of (1) alkylaluminum sesquichlorides as the reducing agent and (2) a mole to mole mixture of tetrakis(trimethylsiloxy) titanium, $Ti[OSi(CH_3)_3]_4$ and tris(trimethylsiloxy) vanadate, $VO[OSi(CH_3)_3]_3$, and preferably, in proportions that provide in the total catalyst an atomic ratio of Al/Ti+V of 8:1 to 20:1 and, still more preferably, 10 to 12:1. Use of a ratio of at least 8:1 is particularly preferred when the reducing agent is an aluminum-containing compound as, at such a ratio, the synergistic effect is particularly marked as, when a catalyst is used that is composed of the reducing agent and only one of the components (i.e., the $Ti[OSi(CH_3)_3]_4$ or $VO[OSi(CH_3)_3]_3$), the catalytic activity is substantially lower when such a catalyst contains more than 8 atoms of aluminum/atom of Ti or V.

In order to further describe the invention, the following examples set forth embodiments of catalyst systems embodied herein for polymerizing ethylene to high molecular weight polymers. For the examples set forth, the reducing agent component of the catalyst system was ethylaluminum sesquichloride (a 1:1 mixture of $Al(C_2H_5)Cl_2$ and $Al(C_2H_5)_2Cl$) and the other components were tetrakis(trimethyl)siloxy titanium and tris-(trimethylsiloxy)vanadium monoxide. Also shown, for comparison purposes and to illustrate the synergistic effect obtained by practice of this invention, examples are also set forth that were carried out under comparable conditions but in which the catalyst contained only one of the aforesaid silicon-containing compounds.

In each of the examples, the polymerization was carried out in a 250 ml., three-necked glass flask equipped with a high speed stirrer, thermometer, mercury manometer for reading reactor pressure, and feed lines supplying ethylene and decahydronaphthalene. The ethylene was supplied through a pressure-reducing valve on a demand basis during the polymerization to maintain a constant ethylene pressure in the reactor (60 mm. Hg gauge). The amount of ethylene absorbed was determined from the pressure drop observed at constant temperatures in a supply tank of known value. With 160 ml. of purified decahydronaphthalene (heated to 125° C.) in the reactor, a 0.1 M solution (in decahydronaphthalene) of ethylaluminum sesquichloride was added in amount sufficient to provide the concentration shown for each example in the following tabulation. After an elapse of 1½ minute, $VO[OSi(CH_3)_3]_3$ and $Ti[OSi(CH_3)_3]_4$ (each in decahydronaphthalene) were added to provide the amounts set forth in the tabulation. The polymerization was carried out for 20 minutes at 60 mm. Hg gauge and 125° C. whereupon the viscous solution of the polymeric product was withdrawn from the reactor and diluted with an equal volume of acetone. The solid polymer was collected by filtration, boiled for 10 minutes in each of three successive portions of a solution of one part by volume of concentrated HCl and two parts by volume of isopropyl alcohol, then boiled for ten minutes in each of three portions of isopropyl alcohol, washed with acetone, and dried in a vacuum oven at 120° C. to constant weight.

*Table I*

| Run No. | $(C_2H_5)_3Al_2Cl_3$, millimole | $Ti[OSi(CH_3)_3]_4$ millimole | $VO[Si(CH_3)_3]_3$, millimole | Al/(Ti+V) Atomic Ratio | Calculated $C_2H_4$ Absorption after 20 min., gram-moles per gram-mole total cat. | Properties of polymer isolated [1] | | |
|---|---|---|---|---|---|---|---|---|
| | | | | | | Relative viscosity [2] | density, grams/cc.[3] | softening point, °C.[4] |
| 1 | 0.193 | 0.035 | | 11.0 | 172 | 1.551 | 0.9545 | 140 |
| 2 | 0.193 | 0.035 | | 11.0 | 190 | | | |
| 3 | 0.175-0.193 | | 0.035 | 10.0-11.0 | 25-51 | 1.676 | 0.9855 | 155 |
| 4 | 0.175 | | 0.035 | 10.0 | 54 | | | |
| 5 | 0.192 | 0.017 | 0.017 | 11.0 | 746 | 1.510 | 0.9482 | 142 |
| 6 | 0.192 | 0.017 | 0.017 | 11.0 | 695 | | | |
| 7 | 0.192 | 0.017 | 0.017 | 11.0 | 773 | | | |

[1] Properties determined on combined polymer from listed runs.
[2] Relative viscosity of a 0.1 weight percent solution in decahydronaphthalene at 130° C.
[3] Determined by ASTM method D-1238.
[4] Softening point under compression at 66 p.s.i.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A polymerization process which comprises contacting lower molecular weight ethylenically unsaturated olefinic hydrocarbon with a combination catalyst comprising (a) a reducing agent from the group consisting of alkylaluminum halides and trialkylaluminum and (b) a mixture of a compound of the following Formula A $$VO(OSiR_3)_3$$

R is a hydrocarbon radical and a compound of the following Formula B $$Ti(OSiR_3)_4$$

R is a hydrocarbon radical, said combination catalyst being further characterized by containing Compound A and Compound B in mole ratio of one mole of Compound A to from about 0.1 to about 10 moles of Compound B providing synergistic activity in polymerizing said olefinic hydrocarbons.

2. A process, as defined in claim 1, wherein the reducing agent is an alkylaluminum chloride.

3. A process, as defined in claim 2, wherein the reducing agent is ethyl aluminum sesquichloride.

4. A process, as defined in claim 3, wherein the compound of Formula A is $VO[OSi(CH_3)_3]_3$ and the compound of Formula B is $Ti[OSi(CH_3)_3]_4$.

5. A process, as defined in claim 1, wherein the catalyst comprises the reducing agent in a ratio of 0.1 to 50 moles per mole of Compound A plus B.

6. A process, as defined in claim 1, wherein the reaction is carried out in presence of from about 0.005 to 10% by weight, based on the weight of the olefinic hydrocarbon, of the combination catalyst.

7. A process, as defined in claim 1, wherein the olefinic hydrocarbon is ethylene.

8. A process, as defined in claim 1, wherein the combination catalyst contains a substantially mole to mole ratio of Compound A and Compound B.

9. A polymerization process which comprises contacting ethylene with from about 0.005 to 10%, based on the weight of ethylene, of a combination catalyst comprising (1) ethyl aluminum sesquichloride and (2) a substantially mole to mole mixture of $Ti[OSi(CH_3)_3]_4$ and $VO[OSi(CH_3)_3]_3$, said catalyst being further characterized by containing said ethyl aluminum chloride in a mole ratio of 0.1 to 50 moles per mole of said mixture of $Ti[OSi(CH_3)_3]_4$ and $VO[OSi(CH_3)_3]_3$.

References Cited in the file of this patent

UNITED STATES PATENTS

| | | |
|---|---|---|
| 2,863,891 | Granchelli et al. | Dec. 9, 1958 |
| 2,938,000 | Wanless | May 24, 1960 |

FOREIGN PATENTS

| | | |
|---|---|---|
| 534,792 | Belgium | Jan. 31, 1955 |

OTHER REFERENCES

English et al.: J. Am. Chem. Soc. 77, January 5, 1955, p. 170.